UNITED STATES PATENT OFFICE.

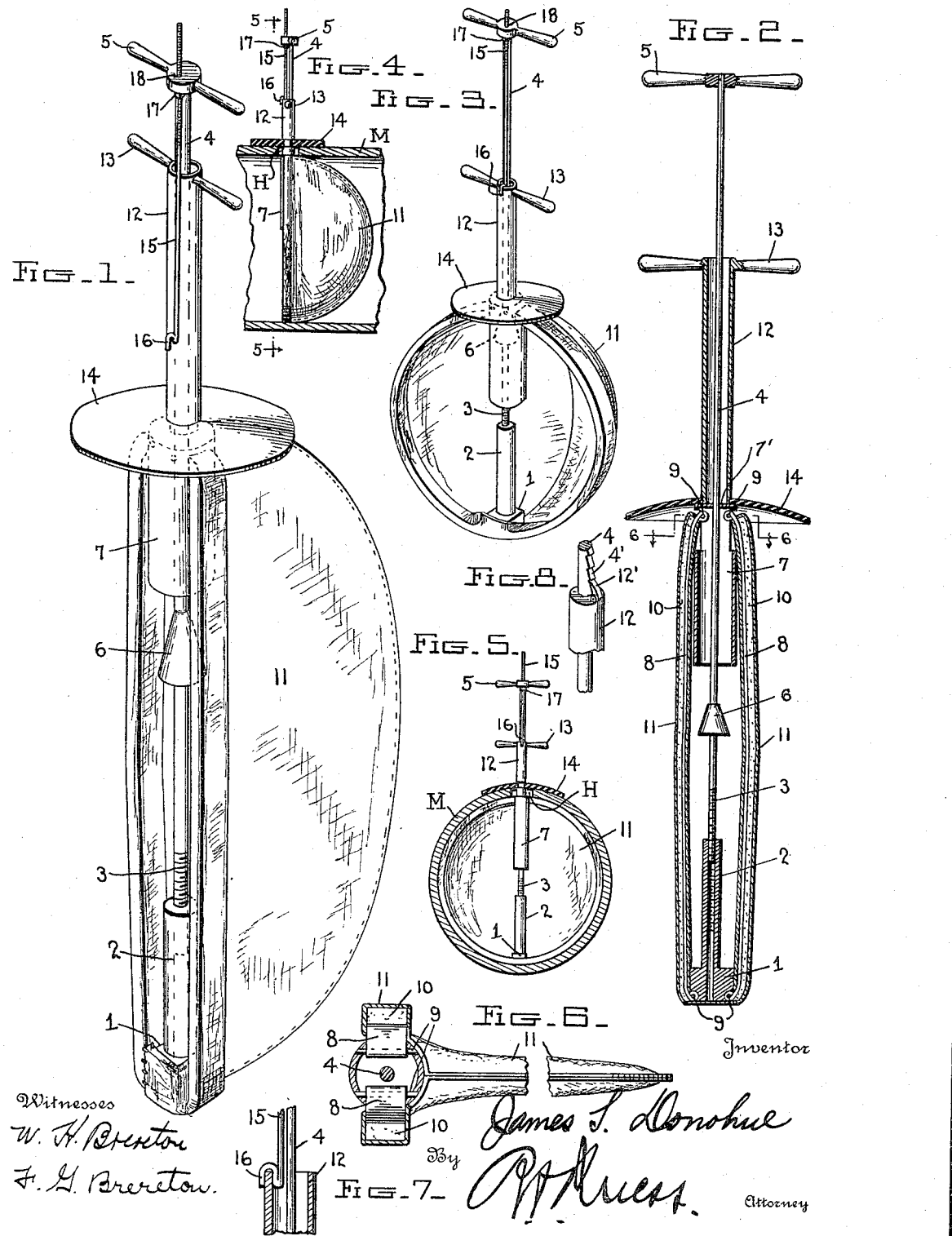

JAMES S. DONOHUE, OF WASHINGTON, DISTRICT OF COLUMBIA, ASSIGNOR OF ONE-THIRD TO JOHN E. MORELAND AND ONE-THIRD TO MICHAEL V. MORAN, BOTH OF WASHINGTON, DISTRICT OF COLUMBIA.

GAS-MAIN STOPPER.

1,151,514.      Specification of Letters Patent.      Patented Aug. 24, 1915.

Application filed February 3, 1914. Serial No. 816,281.

*To all whom it may concern:*

Be it known that I, JAMES S. DONOHUE, a citizen of the United States, residing at Washington, in the District of Columbia, have invented new and useful Improvements in Gas-Main Stoppers, of which the following is a specification.

This invention relates to certain new and useful improvements in gas main stoppers and the primary object thereof is to provide a device of this type which after placement in the main and initial expansion to stop up the latter, may be further expanded, to any desired extent, so as to effectively seal the main by compensating for any imperfections in the inner circumference of the main, which imperfections result from the casting of the main and are present in the form of roughened surfaces caused by depressions and projections.

A further important object of the invention is to provide means which is incorporated in the device to seal the tap after the stopper is inserted in the main and is expanded to operative position.

Still further, the invention aims to provide a device of the type set forth which is of simple and economical construction capable of positive operation with ease, facility and rapidity, which are important factors in the prevention of accidents resulting from the escape of the gas after tapping of the main.

In the drawings: Figure 1 is a perspective view of the invention in collapsed position; Fig. 2 is a longitudinal sectional view; Fig. 3 is a perspective view showing the device in expanded position; Fig. 4 is a side elevation of the invention in operative position in a gas main, the latter being shown in fragment and section, and the gasket which seals the tap being also shown in section; Fig. 5 is a section on the line 5—5 of Fig. 4; Fig. 6 is a section on the line 6—6 of Fig. 2; Fig. 7 is a detail sectional view; and Fig. 8 is a detail fragmentary view of a modified form of means for holding the expander locked.

In proceeding in accordance with this invention a base member 1 is employed which has an upwardly projecting interiorly threaded tubular extension 2, which latter receives on its interior the lower threaded end 3 of a rotatable rod 4, the rod being equipped with a handle 5 by means of which the rod may be manually rotated for a purpose later to be set forth. The rod 4 has a preferably conical guide 6 rigidly mounted thereon, which guide engages with and centers the sliding movements of a tubular head 7.

Longitudinal flat expansible and contractible springs 8 are pivotally mounted at their ends on pins 9, carried by the base 1 and head 7 in order that the springs may move from the position shown in Figs. 1 and 2 to that shown in Figs. 3, 4, and 5. The springs 8 are encompassed by comparatively soft packing 10 over which the free edges of the hemi-spherical rubber bag 11 are secured. Mounted on the upper portion of the rod 1 so as to have sliding movement independent thereof, is a combined tap sealing and expander composed of a tube 12 having an operating handle 13 at its upper end and a rubber gasket 14 suitably secured to its lower end, so that the gasket will partake of the reciprocating movements of the tube. For the purpose of holding the gasket 14 in sealing position over the tap hole H of the gas main M, means is provided to sustain the gasket in tight engagement with the main which means is shown by way of example as consisting of a rod 15 having a hook 16 on its lower end to seat on the upper free edge of tube 12, the upper end of the rod 15 being threaded and passed through an aperture 18 provided therefor in the handle 5, a nut 17 being threaded on rod 15 and abuts the under face of the handle 5 whereby when the parts occupy the positions depicted in Figs. 3, 4, and 5, of the drawings, the tube 12 will be locked against upward movement and the gasket may, by manipulation of the nut 17 be compressed against the main M so as to effectually seal the tap hole H. A further example of a means which can be optionally employed to lock the expander against outward movement, is illustrated in Fig. 8, in which rod 4 has rack teeth 4' engaged by a pawl 12' pivotally connected to the upper end of the tube 12.

The operation may be briefly summarized as follows: Normally the expansive properties of the springs 8 retain the parts in the position shown in Fig. 1, in which position the bag 11 is folded or wrapped about the springs so as to present the structure in compact form enabling same to be placed through the tap hole H, whereupon the handle 13 is gripped and given inward movement to cause gasket 14 to press against and slide head 7 inwardly thus expanding the springs 8 to the positions shown in Figs. 3, 4, and 5. The movement of the head 7 causes the closed end 7' thereof to engage with the upper end of the guide 6 which provides an abutment therefor and limits the extent of inward movement of the head 7 from which it will be seen that rotation of the rod 4 will move the guide 6 toward the base 1 thus decreasing the distance between base 1 and guide 6 which permits further expansive or outward movement of the springs 8 to thus enable the packing 10 and the adjacent free edge portion of the bag to be tightly engaged with the inner circumference of the pipe so as to compensate for any inequalities or defects resulting from casting of the main and to thus effectively seal the latter. The expander tube 11 is now locked against outward movement by use of either the rod 15 or the pawl and rack structure, whereupon if there is any escape of gas, the locking device is rendered inoperative and the rod 4 turned so as to cause the guide or abutment 6 to move toward the base 1, after which the expander is again moved to effect further expansion of the springs which is possible by reason of the abutment having been moved toward base 1, which operation may be repeated until the seal is complete, when the locking device is again made operative. By manipulation of the nut 17 it will be apparent that fine adjustments of the locking rod 15 may be had.

What is claimed is:

1. In a gas main stopper, a bag, spring means to support the bag, means to expand the spring means, means to limit the extent of movement of the expanding means, means to hold the expanding means locked, and means to adjust the limiting means whereby the expanding means may have further movement to effect further expansion of the spring means after initial expansion of the spring means and after the bag is positioned and expanded in the main.

2. In a gas main stopper, a bag, spring means to support the bag, means to expand the spring means, means to limit the extent of movement of the expanding means, means to hold the expanding means locked, means to adjust the limiting means whereby the expanding means may have further movement to effect further expansion of the spring means after initial expansion of the spring means and after the bag is positioned and expanded in the main, and means borne by the expanding means to close and seal the tap hole of the main.

3. In a gas main stopper, a base, a rod having threaded connection with the base and having an abutment thereon, a head slidable on the rod and having its inward movement restricted by said abutment, a bag, spring arms connected to the base and head and to the bag to expand and contract the latter, an expander slidable on the rod to engage said head, and means to lock the expander against outward movement.

4. In a gas main stopper, a base, a rod having threaded connection with the base and having an abutment thereon, a head slidable on the rod and having its inward movement restricted by said abutment, a bag, spring arms connected to the base and head and to the bag to expand and contract the latter, an expander slidable on the rod to engage said head, a gasket carried by the expander for engagement over the main tap hole to seal the latter, and means to lock the expander against outward movement.

5. In a gas main stopper, a base, a head movable relative to the base, a bag, expansible and contractible means to connect the bag to the head and base, adjustable means connected to the base for limiting the extent of movement of the head toward the base and means to lock the head against outward movement and in engagement with said adjustable means.

6. In a gas main stopper, a base, a head movable relative to the base, a bag, expansible and contractible means to connect the bag to the head and base, an expander for actuating said head, means borne by the expander for sealing the tap hole of the main, and means to lock the expander in operative position.

7. In a gas main stopper, expansible and contractible means to close the main, adjustable means to limit the extent of expansion of said first named means, means to operate the first named means, and means to lock the operating means against movement.

8. In a gas main stopper, expansible and contractible means to close the main, means to limit the expansive movement of said means, and means to adjust the limiting means whereby to enable further expansion of said first named means when the latter is in operative position.

In testimony whereof I have hereunto set my hand in presence of two subscribing witnesses.

JAMES S. DONOHUE.

Witnesses:
ROYCE A. RUESS,
CHARLES LOWELL HOWARD.